United States Patent
Eom et al.

(10) Patent No.: US 10,370,002 B2
(45) Date of Patent: Aug. 6, 2019

(54) ENGINE CONTROL METHOD FOR PREVENTING ENGINE STALL FOR VEHICLE ON SLOPED ROAD

(71) Applicant: HYUNDAI MOTOR COMPANY, Seoul (KR)

(72) Inventors: Tae-Kwang Eom, Seoul (KR); Jung-Suk Han, Hwaseong-si (KR); Chang-Hyun Lim, Seoul (KR); Hyeok-Jun Kwon, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 298 days.

(21) Appl. No.: 15/289,575

(22) Filed: Oct. 10, 2016

(65) Prior Publication Data

US 2017/0166211 A1 Jun. 15, 2017

(30) Foreign Application Priority Data

Dec. 14, 2015 (KR) .................. 10-2015-0178047

(51) Int. Cl.
*B60W 30/00* (2006.01)
*B60W 30/18* (2012.01)
*B60W 10/06* (2006.01)
*B60W 10/18* (2012.01)

(52) U.S. Cl.
CPC ...... *B60W 30/18118* (2013.01); *B60W 10/06* (2013.01); *B60W 10/18* (2013.01); *B60W 30/18027* (2013.01); *B60W 2510/101* (2013.01); *B60W 2510/1005* (2013.01); *B60W 2520/10* (2013.01); *B60W 2540/12* (2013.01); *B60W 2540/16* (2013.01); *B60W 2550/142* (2013.01); *B60W 2710/065* (2013.01); *B60W 2710/0644* (2013.01); *B60W 2710/0666* (2013.01); *B60W 2710/18* (2013.01)

(58) Field of Classification Search
USPC .......................................................... 701/70
See application file for complete search history.

(56) References Cited

U.S. PATENT DOCUMENTS

| 8,972,161 B1* | 3/2015 | Koebler ............. G01C 21/3469 701/123 |
| 10,005,470 B2* | 6/2018 | Jeong .................. B60W 40/076 |
| 2005/0119820 A1* | 6/2005 | Sawada ................. B60W 10/06 701/111 |

(Continued)

FOREIGN PATENT DOCUMENTS

| JP | 2001-123860 A | 5/2001 |
| JP | 2001-323826 A | 11/2001 |

(Continued)

*Primary Examiner* — James M McPherson
(74) *Attorney, Agent, or Firm* — Morgan, Lewis & Bockius LLP (57) ABSTRACT

An engine control method for preventing an engine of a vehicle from stalling on a sloped road includes steps of: detecting whether a shifting lever is in a neutral stage (N-stage); measuring a vehicle speed and a slope angle of the sloped road, and calculating a load acting on a vehicle body on the sloped road; accelerating an engine a first time to increase an engine RPM so that an engine torque is larger than the load; and accelerating the engine a second time to move the vehicle when the shifting lever enters into a driving gear stage (D-stage).

5 Claims, 6 Drawing Sheets

(56) References Cited

U.S. PATENT DOCUMENTS

| | | | | |
|---|---|---|---|---|
| 2008/0023238 | A1* | 1/2008 | Shimizu | B60K 6/365 |
| | | | | 180/65.265 |
| 2010/0121550 | A1* | 5/2010 | Inoue | B60W 10/06 |
| | | | | 701/94 |
| 2010/0191434 | A1* | 7/2010 | Fujita | B60T 8/172 |
| | | | | 701/91 |
| 2011/0313647 | A1* | 12/2011 | Koebler | B60L 15/2045 |
| | | | | 701/123 |
| 2013/0124077 | A1* | 5/2013 | Kim | B60W 40/13 |
| | | | | 701/123 |
| 2013/0190944 | A1* | 7/2013 | Brandin | G01C 21/26 |
| | | | | 701/1 |
| 2013/0245923 | A1* | 9/2013 | Matsuda | B60W 10/06 |
| | | | | 701/110 |
| 2014/0067211 | A1* | 3/2014 | Kim | B60W 30/143 |
| | | | | 701/54 |
| 2015/0112566 | A1* | 4/2015 | Takagi | B60T 7/22 |
| | | | | 701/70 |
| 2016/0272205 | A1* | 9/2016 | Kato | B60T 7/12 |
| 2016/0332633 | A1* | 11/2016 | Raffone | G01C 9/08 |
| 2017/0327113 | A1* | 11/2017 | Yamakado | B60W 40/105 |
| 2018/0119808 | A1* | 5/2018 | Miller | B60W 20/00 |
| 2018/0154890 | A1* | 6/2018 | Okuda | B60W 30/09 |

FOREIGN PATENT DOCUMENTS

| | | |
|---|---|---|
| JP | 2005-033866 A | 2/2005 |
| JP | 2007-230478 A | 9/2007 |
| JP | 2012-105386 A | 5/2012 |
| KR | 10-0721095 B1 | 5/2007 |
| KR | 10-1298820 B1 | 8/2013 |

* cited by examiner

FIG.4

ENGINE CONTROL METHOD FOR PREVENTING ENGINE STALL FOR VEHICLE ON SLOPED ROAD

CROSS-REFERENCE TO RELATED APPLICATION

This application claims the benefit of priority to Korean Patent Application No. 10-2015-0178047, filed in the Korean Intellectual Property Office on Dec. 14, 2015, the entirety of which is incorporated herein by reference.

TECHNICAL FIELD

The present disclosure relates to an engine control method for preventing an engine of a vehicle from stalling on a sloped road, and more particularly, to an engine control method for preventing an engine of a vehicle from stalling on a sloped road that is capable of preventing engine stall from occurring when a vehicle that is parked or stopped on a sloped road starts driving.

Particularly, the present disclosure relates to an engine control method for preventing engine stall of a vehicle that occurs by a synchronization failure of an engine when a driver shifts a gear into neutral by mistake while maintaining a brake stop state on a sloped road, and then, shifts the gear into a driving gear.

BACKGROUND

An engine of a vehicle may stall when starting to drive a vehicle parked or stopped on a sloped road. Patent document 1 discloses an operation stop phenomenon of an engine and its countermeasures due to inexperienced operation of a brake pedal when a driver operates an accelerator pedal and a brake pedal simultaneously on a sloped road.

Patent document 1 discloses, in reference to causes about the engine stall phenomenon, that the engine stall may be caused by insufficient torque for an engine to engage in forward driving when the vehicle is moving backwards in a driving gear (D-stage) since a sensor mounted at a torque convertor is configured with a one way sensor unable to recognize a rotation direction of an output shaft.

The foregoing is intended merely to aid in the understanding of the background of the present disclosure, and is not intended to mean that the present disclosure falls within the purview of the related art that is already known to those skilled in the art

PRIOR ART DOCUMENT

Patent Document (Patent Document 1) Korea registered patent publication No. 10-1298820 (Aug. 23, 2013)

SUMMARY

The inventors of the present invention discovered that an engine stall phenomenon may occur by circumstances and causes completely different from a typical engine stall phenomenon on a sloped road as disclosed in Patent Document 1.

When a vehicle is stopped on a sloped road, the driver may step on the brake pedal while maintaining a gear of the vehicle in a neutral gear state (N-stage) because of fuel efficiency reduction or other reasons. In addition, there is a case that, in maintaining a brake stop state, a driver shifts a gear into N-stage by mistake without shifting into D-stage in order for forward driving.

In this case, if the driver releases the brake, the vehicle body may be pushed backwardly by gravity to the vehicle body, since the gear is coupled to the N-stage. At this time, there was a case that the engine may stall of previously unknown causes when the driver shifts the gear into the D-stage after a short period of time passed. In this situation, the driver may distrust the vehicle quality because of the lack of understanding regarding the cause of the engine stall, and there is also a concern regarding generating rear end impacts with vehicles to the rear of the vehicle.

Accordingly, the present disclosure has been made keeping in mind the above problems occurring in the related art, and the present disclosure is intended to propose an engine control method for preventing engine stall of a vehicle from occurring when a driver shifts a gear into N-stage by mistake, and then, changes it to D-stage while maintaining a brake stop state on a sloped road.

As the result of researching on studying the engine stall, the inventors of the present invention discovered that the engine stall cause results from a failure of engine synchronization based on a rear pushing load of a vehicle.

Figure 5:
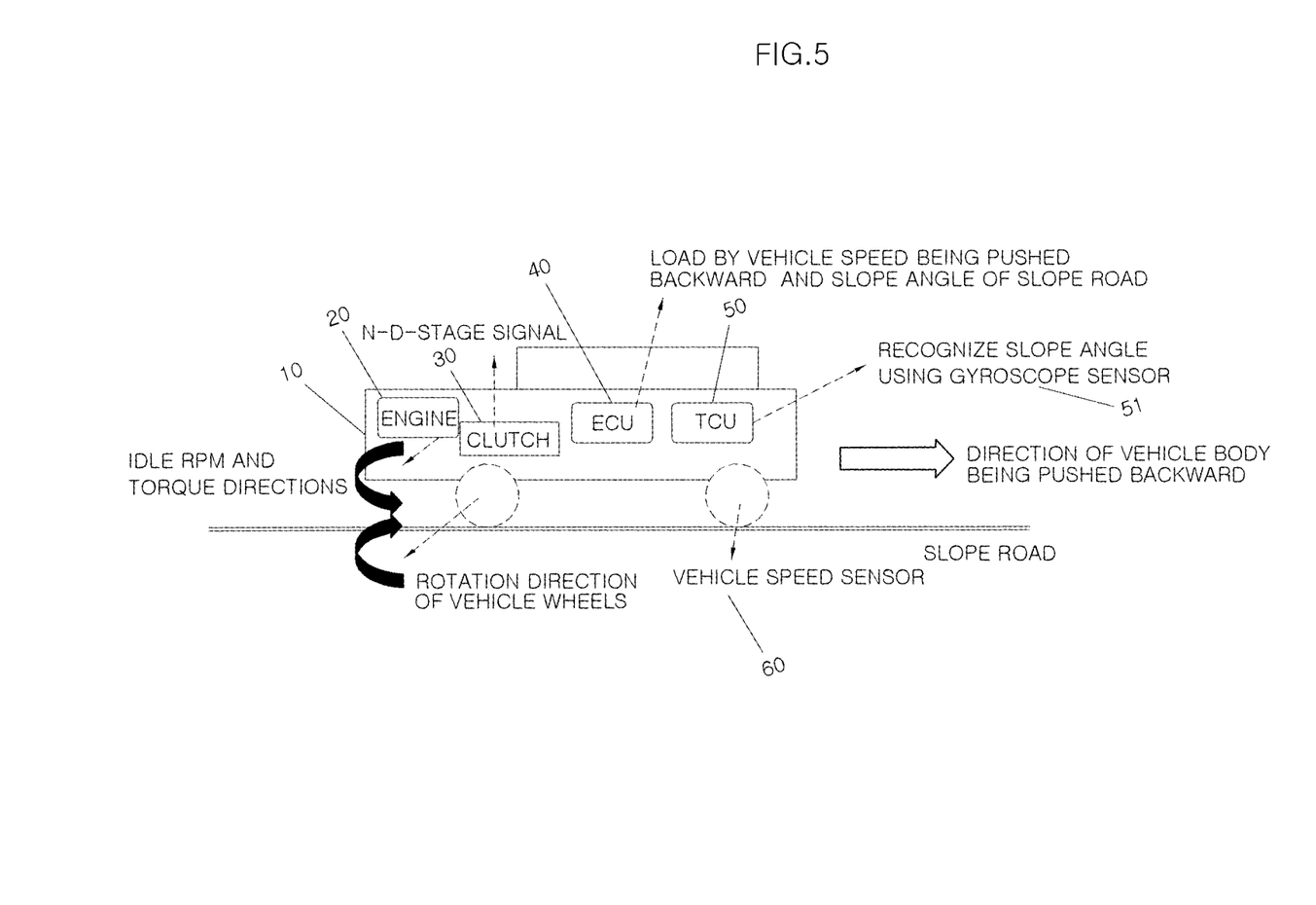
FIG. 5 is a drawing explaining a state that a vehicle is being pushed rearward when shifting a gear into N-stage on slope road.

A shown in FIG. 5, after a gear of vehicle 10 located on a sloped road is shifted into N-stage, when the gear is shifted into D-stage in a state that a vehicle speed reaches 10 km/h by a rear pushing of the vehicle 10 because of gravity to the vehicle 10, there exists a case that a torque in an idle RPM of an engine 20 in the prior N-stage balances in a moment with a load by a vehicle acceleration being pushed backward by gravity to the vehicle 10 when shifting into the D-stage. At this time, a rotation of a crankshaft is almost stopped in a moment due to power balance.

In this case, the signal about a crank angle is not transmitted from a crankshaft angle sensor detecting the crank angle over a certain time period. Therefore, an ECU 40 determines that there is a problem with the engine synchronization, and stops fuel injection and spark operation over a certain time period, thereby causing the engine to stall.

Based on this knowledge regarding the cause of the engine stall, the present inventors discovered that it is possible to solve the engine stall problem by increasing an idle RPM of an engine when shifting a gear into N-stage on a sloped road so that, thereafter, the torque of the idle RPM can overcome a load by increasing the acceleration of the vehicle when shifting the gear into D-stage.

An engine control method according to the present disclosure based on these research results, may include the steps of detecting whether a shifting lever is in a neutral stage (N-stage); measuring a vehicle speed and a slope angle of the sloped road, and calculating a load acting on a vehicle body on the sloped road; accelerating an engine a first time to increase an engine RPM so that an engine torque is larger than the load; and accelerating the engine a second time to move the vehicle when the shifting lever enters into a driving gear stage (D-stage).

The accelerating of the engine a first time may further include the steps of determining whether the measured vehicle speed is the same or greater than a predetermined value or not; operating a brake when the measured vehicle speed is the same or greater than the predetermined value; and calculating a changed load depending on the reduced vehicle speed when the vehicle speed is less than the predetermined value by operation of the brake, and adjusting the engine RPM in order for the engine torque to correspond to the changed load.

The accelerating of the engine a first time may include the steps of detecting whether the brake of the vehicle is engaged by the driver or not; and stopping an acceleration control for increasing the engine RPM when the brake of the vehicle is engaged.

The engine control method may further include a step of an engine acceleration for increasing the engine RPM so that the engine torque may be greater than the load, by calculating the load acting on the vehicle body depending on the detected vehicle speed and the slope angle of the sloped road when the brake of the vehicle is engaged and the detected vehicle speed is not 0.

The step of accelerating an engine may further include the steps of detecting an acceleration of the vehicle body during one working cycle after a driver shifts the shifting lever into the D-stage; and returning the increased engine RPM to an original idle RPM by determining that the vehicle starts normally with the D-stage on the sloped road when the acceleration of the vehicle body is greater than 0 and the D-stage shifting of a transmission is maintained just so during the one working cycle.

According to the present disclosure, when a vehicle is stopped on a sloped road, it is able to prevent engine stall of a vehicle even when a gear shift is implemented by driver's mistake in a state that a gear is shifted into N-stage.

Because of this, it is possible to improve a driver's experience with the vehicle and there is an effect capable of preventing a secondary collision accident with following vehicles on the sloped road due to the engine stall.

In addition, the present disclosure has the effect of improving the driving sensitivity and driving stability of a driver by ensuring smooth vehicle starting when restarting after stopping on slope road.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF THE EMBODIMENTS

Hereinafter, exemplary embodiments in the present disclosure will be described in detail with reference to FIG. 1A and FIG. 1B to FIG. 5.

Figure 1A:
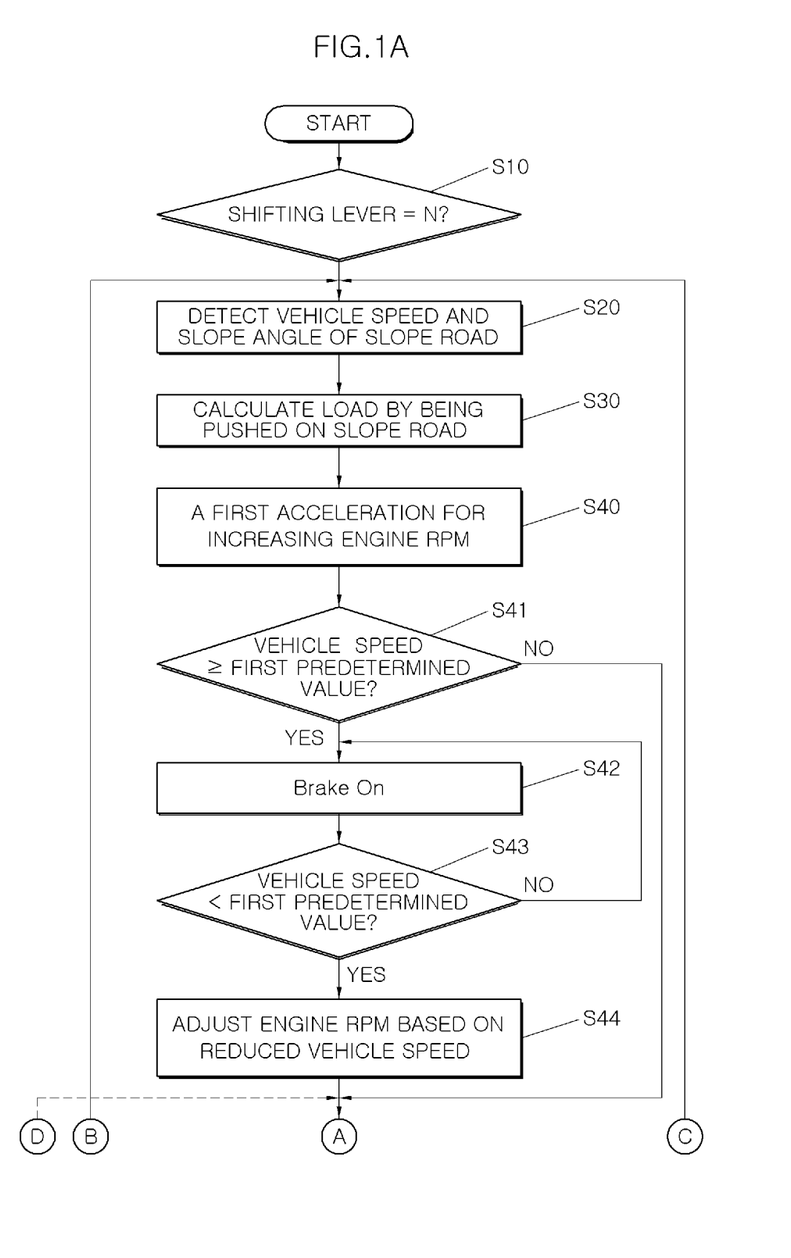
FIG. 1A and FIG. 1B are flow charts of an engine control method for preventing engine stall of a vehicle on a sloped road according to an exemplary embodiment in the present disclosure.
Figure 1B:
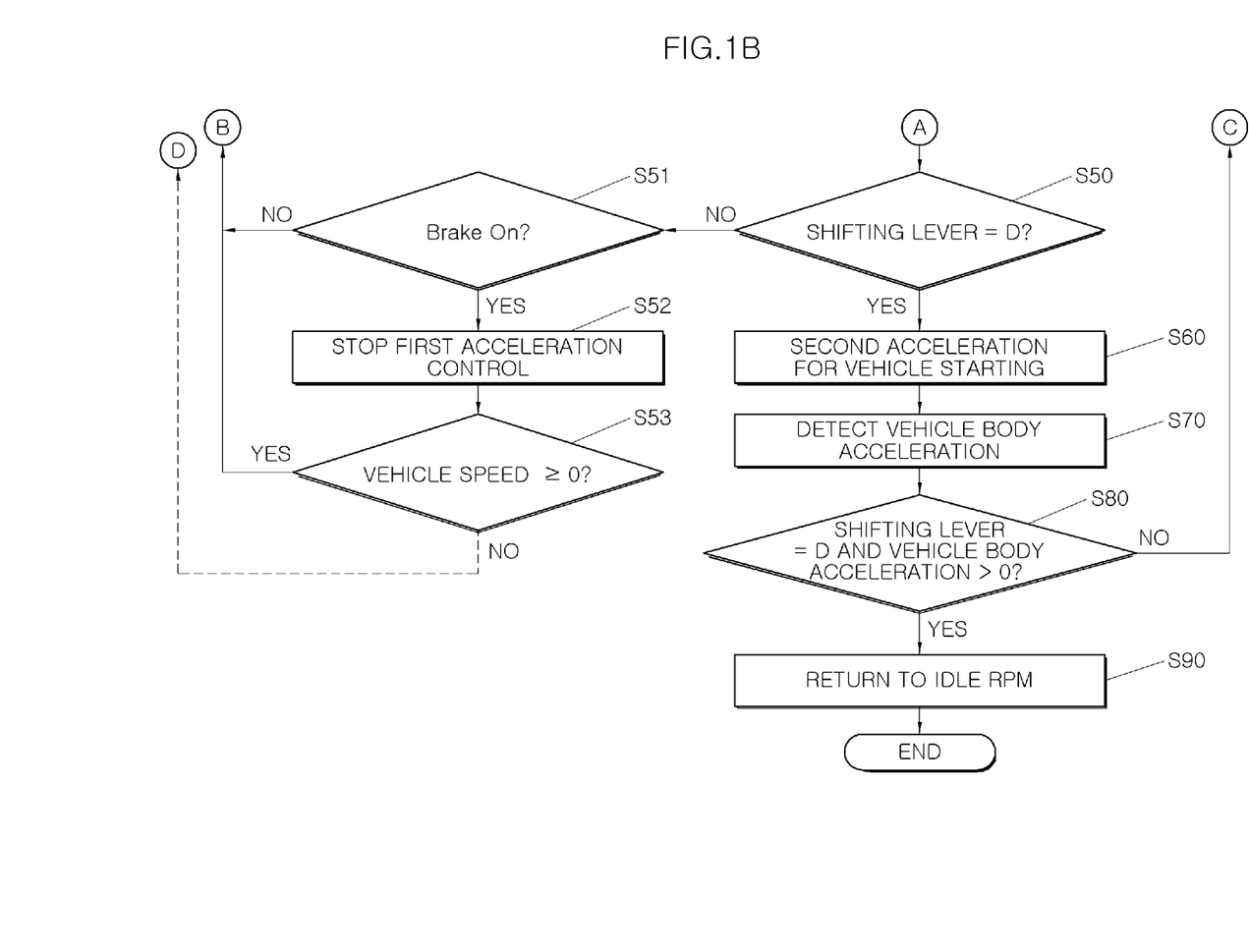

FIG. 1A and FIG. 1B are a flow charts of an engine control method for preventing engine stall of a vehicle on sloped road according to an exemplary embodiment Referring to FIG. 1A and FIG. 1B and FIG. 5, an ECU (Engine Control Unit) 40 may initially determine through a shifting signal of a clutch 30 whether a shifting lever is shifted into N-stage or not (S10).

A vehicle may be pushed backward when the vehicle is stopped on a slope road with the shifting lever shifted into the N-stage, and thereafter, a load by acceleration of a vehicle being pushed backward may be acted to an engine when shifting into D-stage. Therefore, in order to correspond to this, it may measure a slope angle of the slope mad using a gyroscope sensor 51 mounted at a TCU (Transmission Control Unit) 50, and measure a speed of the vehicle being pushed backward using a vehicle speed sensor 60 (S20).

The ECU 40 may calculate a load acting on the engine by the acceleration of the vehicle being pushed backward using the measured values, after measuring the slope angle of the slope road and the speed of a vehicle body 10 being pushed backward (S30). The load acting on the engine by the acceleration of the vehicle being pushed backward, preferably, may be obtained by the following equation (1).

$$L = \mu \times m \cdot g \cdot \sin\theta \times m \cdot a \quad (1)$$

(Herein, L is a load(N·m) acting on an engine by an acceleration of a vehicle being pushed backward, m is a vehicle body mass (kg), g is an acceleration of gravity (m/s²), θ is a slope angle of a slope road (°), and a is an acceleration of a vehicle being pushed backward (m/s²))

As described above, if a vehicle is stopped on the slope road with the gear thereof shifted into the N-stage, the vehicle body 10 may be pushed backward. At this time, if the load occurred by the acceleration of the vehicle body being pushed backward balances with a torque in an idle RPM of the engine, the engine stall phenomenon may occur when shifting into the D-stage, thereafter, as described above. Therefore, in order to prevent the engine stall phenomenon, the ECU 40 may implement a first acceleration for increasing the idle RPM of the engine so that the torque of the engine can be larger than the load by vehicle being pushed backward calculated in the step of S30 (S40).

After the first acceleration, the ECU 40 may determine through a shifting signal of the clutch 30 whether a driver shifts the shifting lever from the N-stage into the D-stage (S50). Unlike the prior art, since the engine is accelerated in order for the torque in the idle RPM of the engine to be larger than the load by vehicle being pushed backward in the present invention, even if the gear is shifted into D-stage, the problem of synchronization failure of the engine may not be occurred.

Meanwhile, when a driver operates the shifting lever to the D-stage, the ECU 40 may implement a second acceleration accelerating the engine for starting the vehicle (S60). By this, the vehicle may initiate the normal driving without the engine stall when shifting into the D-stage.

In addition, preferably, after a driver shifts the shifting lever into the D-stage (forward driving gear stage), the ECU 40 may detect an acceleration variation of the vehicle body using the vehicle speed sensor 60 during one working cycle (S70).

Furthermore, when the acceleration of the vehicle body is larger than 0 and the D-stage shifting of a transmission is maintained just so, the ECU 40 may determine that the vehicle started smoothly and normally with the D-stage on the sloped road. In this case, since there is no need to carry out the algorithm for preventing the engine stall, the ECU 40 may return the increased engine RPM to original idle RPM (S90).

Figure 2:
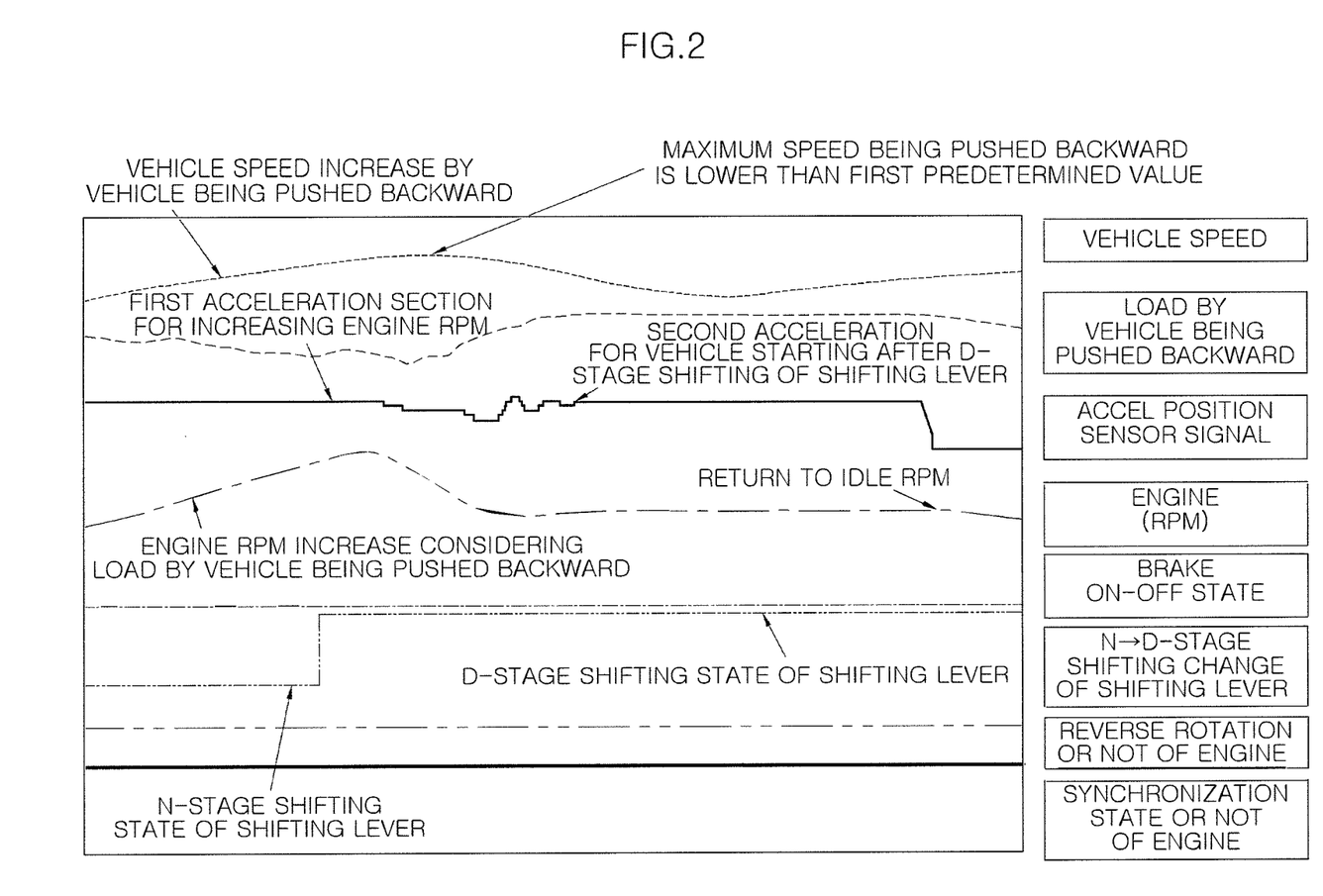
FIG. 2 is a drawing showing engine states when a vehicle applying an engine control method according to a first exemplary embodiment is travelling on a sloped road.

FIG. 2 shows engine states applying an engine control method according to a first exemplary embodiment in the present disclosure. As shown in FIG. 2, the synchronization state of the engine maintains a normal state after shifting into the D-stage by increasing an engine RPM considering the load of the vehicle being pushed backward in the N-stage shifting state of the shifting lever.

Subsequently, a second exemplary embodiment in the present disclosure will be described with reference to FIG. 1A and FIG. 1B and FIG. 3. Hereinafter, a portion overlapping with the first exemplary embodiment will not be described, but only portions different from the first exemplary embodiment will be described.

As described in the first exemplary embodiment, the present invention accelerates the engine a first time so that the torque in the idle RPM of the engine may be larger than the load acting on the engine by the vehicle being pushed backward. In this case, if the speed of the vehicle being pushed backward is too large, the amount that the idle RPM of the engine is increased for overcoming the load of the vehicle being pushed backward is also increased. At this time, since the engine RPM is higher when shifting into the D-stage thereafter, there are concerns of worsening driving stability of a vehicle when starting and giving a driver a sense of discomfort.

Therefore, the second exemplary embodiment may operate a brake in order to reduce the speed of a vehicle being pushed backward when the measured speed of a vehicle being pushed backward is the same or larger than a first predetermined value. Hereinafter, the second exemplary embodiment will be described in more detail.

Firstly, after the first acceleration is achieved in order to increase the idle RPM of the engine (S40) in the first exemplary embodiment, ECU 40 may determine whether the speed of a vehicle being pushed backward measured through the vehicle speed sensor 60 is the same or larger than a first predetermined value (S41). When it is determined that the speed of a vehicle being pushed backward is the same or larger than the first predetermined value, a brake is operated in order to reduce the speed of a vehicle being pushed backward by determining that it is difficult to ensure stable vehicle starting and a driver's driving sensibility (S42).

When the speed of a vehicle being pushed backward is reduced by the brake operation, it may be determined whether the reduced speed of a vehicle being pushed backward is less than the first predetermined value (S43). The brake operation state may be maintained when the reduced speed of a vehicle being pushed backward is the same or larger than the first predetermined value.

When the reduced speed of the vehicle being pushed backward is less than the predetermined value, the ECU 40 may adjust the engine RPM based on the reduced speed of a vehicle (S44). That is, the ECU 40 may calculate a load changed depending on the reduced speed of the vehicle, and adjust the engine RPM in order for the engine torque to correspond to the changed load.

In addition, it is desirable to switch the brake operation to OFF state in order for smooth vehicle starting in the second acceleration for the vehicle starting (S60). Furthermore, the brake operation is implemented in order to reduce the speed of the vehicle being pushed backward before a driver shifts the shifting lever into the D-stage in FIG. 1A and FIG. 1B, but it is not limited thereto. As shown in FIG. 3, the brake operation may be implemented directly after a driver shifts the shifting lever into the D-stage.

According to the second exemplary embodiment, it is possible to reduce the load acting on the engine by the a vehicle being pushed backward by operating the brake in order for the speed of a vehicle being pushed backward to be reduced when the speed of a vehicle being pushed backward is greater than a predetermined value such as slope load. Therefore, it is able to maintain the engine RPM in order to prevent the engine stall to be low, thereby resolving driving instability and a driver's discomfort by rapid acceleration, and so on, after shifting into the D-stage.

Figure 3:
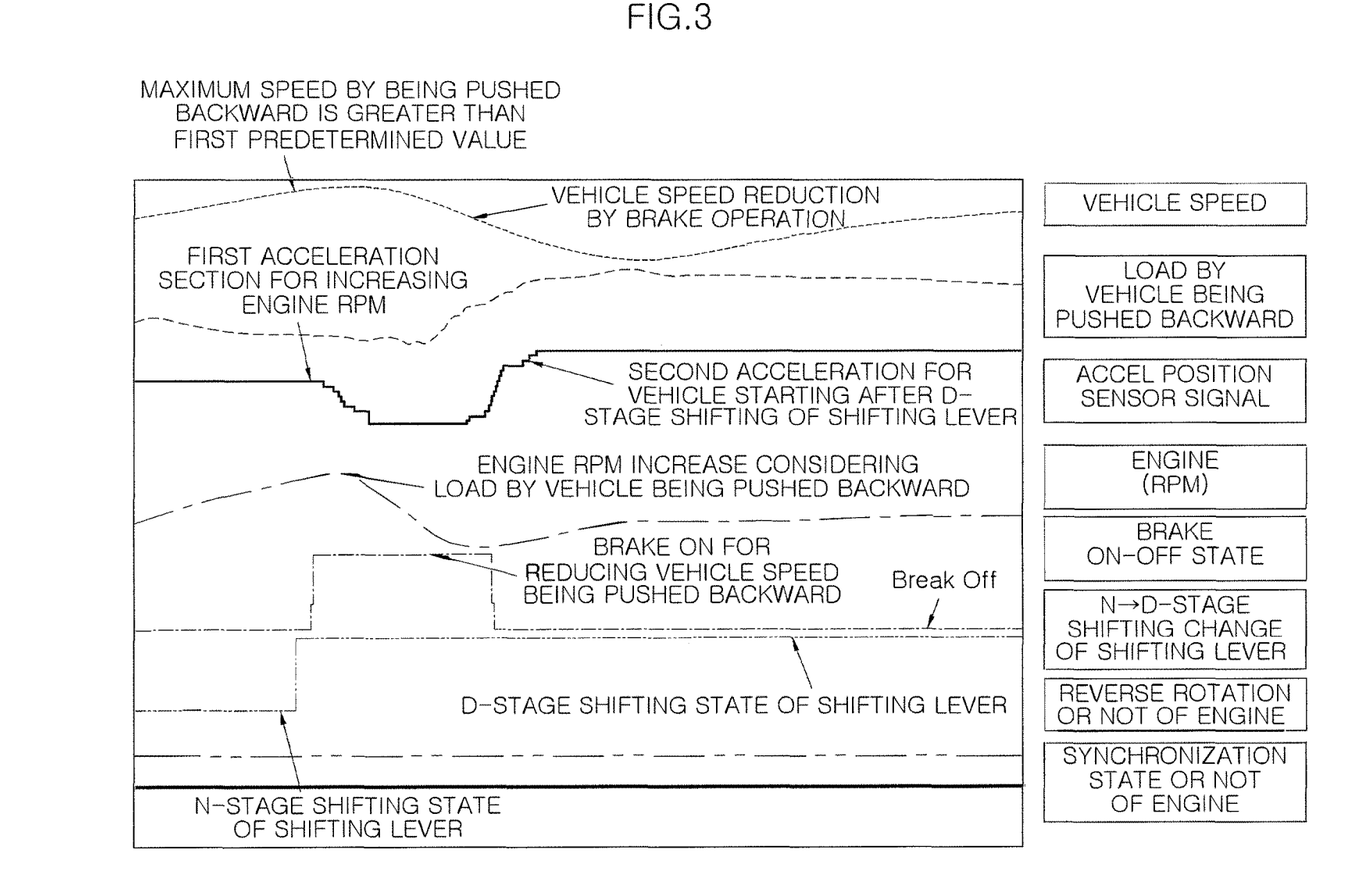
FIG. 3 is a drawing showing engine states when a vehicle applying an engine control method according to a second exemplary embodiment is travelling on a sloped road.

FIG. 3 shows engine states implementing the engine control method according to a second exemplary embodiment As shown in FIG. 3, in the second exemplary embodiment, when a maximum speed of a vehicle being pushed backward rises over the first predetermined value, the brake operation becomes on-state so that the speed of a vehicle being pushed backward is reduced, thereby maintaining synchronization state of the engine to a normal state even with lower engine RPM increase.

Subsequently, a third exemplary embodiment will be described with reference to FIG. 1A and FIG. 1B and FIG. 4. Hereinafter, a portion overlapping with the first exemplary embodiment will not be described, but only portions different from the first exemplary embodiment will be described intensively.

As described in the first exemplary embodiment, the present invention initially accelerates the engine so that the torque in the idle RPM of the engine may be larger than the load acting on the engine by the vehicle being pushed backward, thereby resolving the engine stall. There is no need to increase the engine RPM in order for protecting the engine stall when a driver steps on a brake pedal in order to prevent the vehicle from being pushed backward on slope road even when shifting into N-stage. The third exemplary embodiment relates to an engine control method in such a situation.

First, after the first acceleration is achieved in order to raise the idle RPM of the engine (S40), the ECU 40 may detect through a pedal sensor whether the brake pedal is operated by a driver or not (SM).

When it is determined that the brake pedal is operated by a driver, since the motion of a vehicle being pushed backward is restrained by the brake operation, there is no need to raise the idle RPM of the engine. Therefore, the first acceleration control for increasing the idle RPM of the engine is stopped (S52).

There may be a case in which the vehicle is not completely stopped even though the brake pedal is operated by the driver. In this case, the phenomenon of vehicle to be pushed backward may occur even though the brake operation is engaged.

Therefore, when the brake operation is engaged by a driver, the ECU 40 may receive the measured results of the speed of the vehicle being pushed backward from the vehicle speed sensor 60 and determine whether the speed is greater than 0 (S53). When it is determined that the detected speed of a vehicle being pushed backward is not 0, that is, the vehicle is pushed backward, the ECU 40 may calculate a load acting on the vehicle body depending on the detected speed and the slope angle of the slope road, and implement the first acceleration control in order to increase the engine RPM so that the engine torque may be greater than the load.

Figure 4:
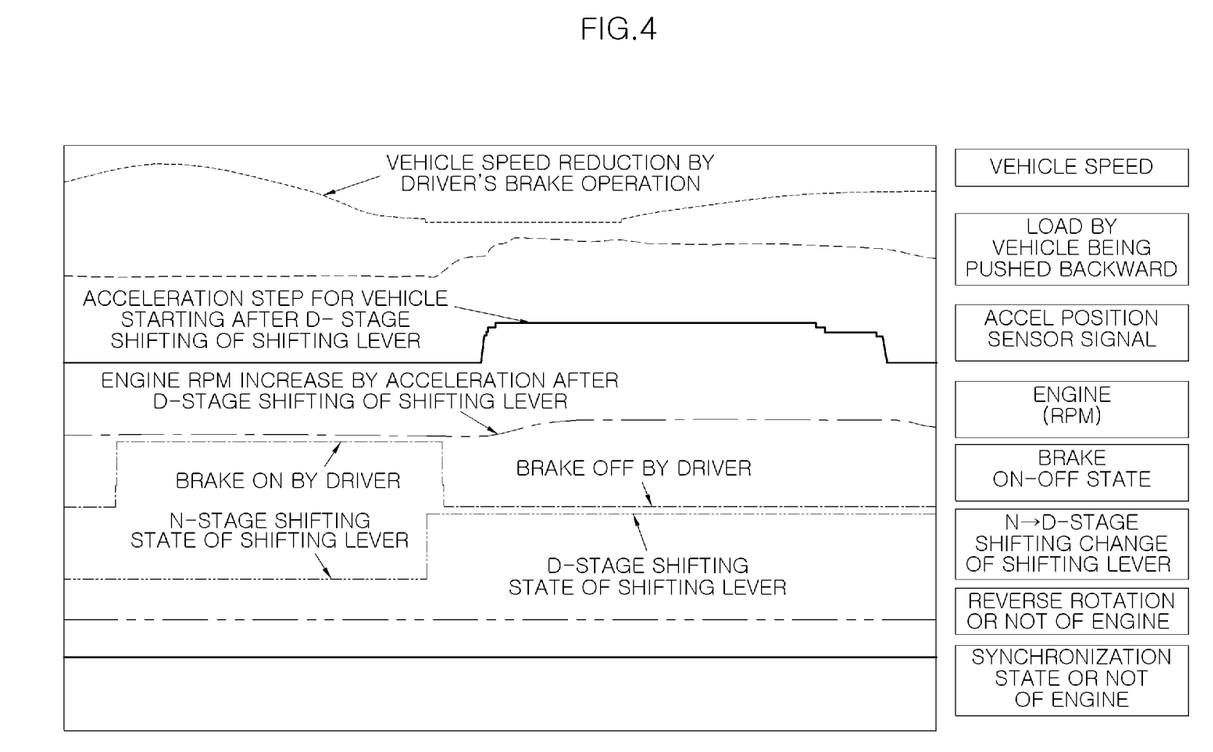
FIG. 4 is a drawing showing engine states when a vehicle applying an engine control method according to a third exemplary embodiment is travelling on slope road.

FIG. 4 shows engine states when the engine control method according to a third exemplary embodiment is implemented. As shown in FIG. 4, the acceleration control for increasing the idle RPM of the engine may not be implemented during the brake operation is achieved by a driver in the third exemplary embodiment. The engine acceleration may be achieved for starting a vehicle after a driver shifts the shifting lever into the D-stage with operating the brake.

By the third exemplary embodiment, the present invention is able to protect an empty engine RPM increase to reduce fuel consumption, and promote driving stability and a driver's driving sensibility improvement when starting.

The engine control method for preventing engine stall on a sloped road can say the technology that can be applied regardless of the type of an internal combustion engine. This is, regardless of the type of an internal combustion engine and the shifting method, the problem which the present invention seeks to solve may be occurred when shifting a gear from N-stage into driving stage on slope road, and it can be solved through the engine control method according to the present invention.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An engine control method for preventing an engine of a vehicle from stalling on a sloped road, comprising steps of:
    detecting whether a shifting lever is in a neutral stage (N-stage) when the vehicle that is parked or stopped on a sloped road;
    measuring a vehicle speed and a slope angle of the sloped road, and calculating a load acting on a vehicle body on the sloped road;
    accelerating an engine a first time to increase an engine revolution per minute (RPM) so that an engine torque is larger than the load when the shifting lever is in the neutral stage; and
    accelerating the engine a second time to move the vehicle when the shifting lever enters into a driving gear stage (D-stage).

2. The engine control method of claim 1, wherein the step of accelerating the engine the first time further comprises the steps of:
    determining whether the measured vehicle speed is the same or greater than a predetermined value;
    operating a brake when the measured vehicle speed is the same or greater than the predetermined value; and
    calculating a changed load depending on a reduced vehicle speed when the vehicle speed is less than the predetermined value, and adjusting the engine RPM such that the engine torque corresponds to the changed load.

3. The engine control method of claim 1, wherein the step of accelerating the engine the first time comprises the steps of:
    detecting whether a brake of the vehicle is engaged by a driver; and
    stopping an acceleration control for increasing the engine RPM when the brake of the vehicle is engaged.

4. The engine control method of claim 3, further comprising a step of an engine acceleration for increasing the engine RPM so that the engine torque is greater than the load by calculating the load acting on the vehicle body depending on a detected vehicle speed and the slope angle of the slope road when the brake of the vehicle is engaged and the detected vehicle speed is greater than 0.

5. The engine control method of claim 1, wherein the step of accelerating an engine a second time further comprises the steps of:
    detecting an acceleration of the vehicle body during one working cycle after a driver shifts the shifting lever into the D-stage; and
    returning the increased engine RPM to an original idle RPM by determining that the vehicle starts normally with the D-stage on the slope road when the acceleration of the vehicle body is greater than 0 and the D-stage shifting of a transmission is maintained during the one working cycle.

* * * * *